Patented July 23, 1940

2,208,790

UNITED STATES PATENT OFFICE 2,208,790

ALDONIC ACID SALTS OF ANESTHETIC BASES

David Curtis, New York, N. Y.

No Drawing. Application April 7, 1936,
Serial No. 73,137

16 Claims. (Cl. 260—471)

The present invention relates to the compounds of anesthetic bases with the aldonic acids and to anesthetic preparations made of these anesthetic substances.

It is the object of the present invention to provide a new series of highly useful anesthetic substances of high potency which are of minimum toxicity by linking the anesthetic bases to substances which are body foods and readily oxidizable in the body, making such anesthetic substances highly suitable for use as surface and local anesthetics.

It is also an object of the present invention to devise processes for preparing such anesthetic substances and solutions containing the same, which are highly efficient and effective, which are economical and easy to follow and practice.

It is a further object of the present invention to provide a group of benzocaine compounds which are appreciably soluble in water to an extent sufficient to prepare aqueous solutions of the same, suitable for use as surface and local anesthetics.

I have found that various anesthetic bases, such as procaine and benzocaine of the ethyl, butyl and isopropyl types, and the like, will combine, under certain conditions with the aldonic acids, to form anesthetic substances of high potency and great compatibility with the body tissues and fluids which makes them effective and desirable anesthetics, both in local and surface anesthesia. These anesthetic bases combine readily, upon proper procedure, with any of the aldonic or sugar acids, particularly with gluconic and galactonic acids. The group of aldonic acids capable of combining with the anesthetic bases also includes mannonic acid, xylonic acid, arabonic acid and other similar polyhydroxy-carboxylic acids.

The aldonic acid salts of the anesthetic bases have the general formula as follows:

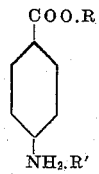

where R stands for an alkyl or alkamine radicle or group and R' stands for the aldonic acid.

A general method for forming these anesthetic salts, using gluconic acid as an example, and isolating them in pure form, is as follows. Acetone, in its anhydrous form is used as the vehicle and a weighed quantity of an acid is dissolved in it, oxalic acid being highly suitable for the purpose. An aqueous solution of calcium gluconate in equimolecular proportion to the acid used, and preferably in slight excess, is then added and the mixture warmed and shaken and then allowed to stand for some time to allow complete formation and precipitation of calcium oxalate. The latter is then filtered off, leaving pure gluconic acid in solution. An equimolecular weight of the anesthetic base is then added and the solution again vigorously stirred and allowed to stand to permit the reaction to complete. A slight excess of the anesthetic of the gluconic acid may be present.

When procaine is used as the anesthetic base and the solution is evaporated, the residue assumes a tacky balsamic form, similar to the procaine-glucono-lactone, is readily soluble in water and in alcohol, and gives an alkaline reaction.

Procaine gluconate probably has the structural formula:

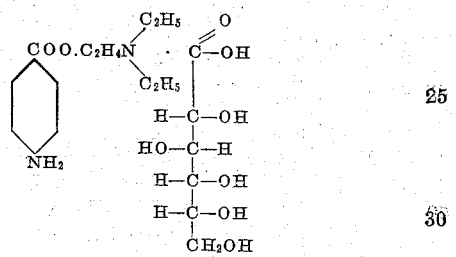

When benzocaine is used as the anesthetic base and the solution is evaporated to drive off the vehicle benzocaine gluconate is formed, which is a white crystalline substance and has a structural formula, probably as follows:

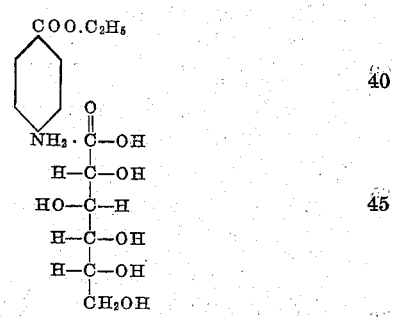

A 0.2% solution of it in water registers a pH of about 2.6 to thymol blue (acid).

As a specific example of preparing one of the salts of the present invention, the following may be taken. 1.26 gms. of crystalline oxalic acid are dissolved in 75 cc. of acetone and an aqueous solution of 4.483 grams of crystalline calcium gluconate (the mono-hydrate) are stirred in for several minutes and the mixture allowed to stand for several minutes until the calcium gluconate is completely transformed to calcium oxalate. The calcium oxalate is then filtered off and washed several times with small amounts of acetone and water to remove the gluconic acid from the precipitate. To the filtrate is then added 4.72 gms. of procaine base and stirred and warmed until the action is complete and the formed procaine gluconate goes into solution.

The chemical reaction may be represented as follows:

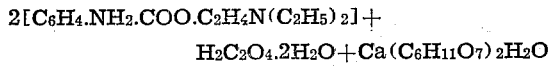

yields

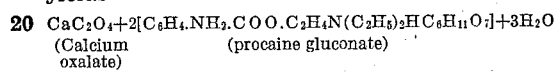

As a specific example for preparing benzocaine gluconate the following may be given: 3.30 grams of benzocaine base are dissolved in 50 cc. of acetone and 1.26 gms. of crystalline oxalic acid in acetone solution are stirred into the solution. Benzocaine oxalate is formed at once as a crystalline precipitate, which is redissolved by the addition of 25 cc. more of acetone and stirring. 4.483 grams of hydrous crystalline calcium gluconate in aqueous solution are stirred in and the stirring continued vigorously for several minutes. The mixture is allowed to stand for a time until the formation of calcium oxalate is complete. The calcium oxalate precipitate is then filtered off and the solvent mixture is removed by evaporation from the filtrate, leaving the residue of benzocaine gluconate, which may be recrystallized from water.

The aldonic acid salts of procaine, which are soluble in water, and other anesthetic bases, may be prepared for direct use as an anesthetic solution by the above method, as well as by the direct union of gluconic acid and procaine base in a watery or other suitable medium, ethyl alcohol and the like.

All of the anesthetic products of the present invention may be used in the practice of anesthesia in the usual manner, in solution or in powder forms or in unguents, or in tablets, in association with any of the usual substances customarily used, such as vaso-constrictors, as epinephrine, preservatives, when necessary, anti-oxidants, both of acid or alkaline nature, and physiological salts.

The water soluble anesthetic salts of the present invention, such as the procaine salts may be directly formed in solution, ready for use as anesthetic preparations, without first isolating them, by using the direct union process for preparing them, as described above. These acid salts are prepared in ready solution, and all that is necessary is to adjust such solutions to the required concentration of anesthetic and to add to the solution the desired ingredients usually added to make the anesthetic suitable for an injection.

This completes the description of the products and processes of the present invention, and it is to be understood that I do not wish to limit myself to the specific products and processes hereinabove described, as, obviously many variations of the same may be made, without the use of the inventive faculties and within the spirit and scope of the present invention and the claims hereto appended.

What I claim is:

1. An aldonic acid salt of an anesthetic base.

2. An aldonic acid salt of an ester of an amino-aromatic acid.

3. An aldonic acid salt of an ester of an amino-aromatic acid of the group of alkyl and alkamine esters of amino-benzoic acid.

4. An aldonic acid salt of diethyl-amino-ethanol-para-amino-benzoate.

5. An aldonic acid salt of ethyl-para-amino-benzonate.

6. A gluconic acid salt of an ester of an amino-aromatic acid.

7. A gluconic acid salt of an ester of an amino-aromatic acid of the group of alkyl and alkamine esters of amino benzoic acid.

8. A gluconic acid salt of diethyl-amino-ethanol-para-amino-benzoate.

9. A gluconic acid salt of ethyl-para-amino-benzoate.

10. A galactonic acid salt of an ester of an amino-aromatic acid.

11. A galactonic acid salt of an ester of an amino-aromatic acid of the group of alkyl and alkamine esters of amino-benzoic acid.

12. A galactonic acid salt of diethyl-amino-ethanol-para-amino-benzoate.

13. The process for preparing an aldonic acid salt of an anesthetic base which comprises the steps of dissolving a definite quantity of oxalic acid in a volatile solvent, separately dissolving an equimolecular weight of a calcium salt of an aldonic acid in a small volume of boiling water and then cooling such calcium salt solution, bringing the said solutions in contact and stirring and mixing thoroughly the resulting mixture until the formation of calcium oxalate is complete, filtering off the calcium oxalate and adding the anesthetic base to the filtrate in equimolecular proportion to the aldonic acid formed, and then removing the vehicle and drying the residue.

14. The process for preparing an aldonic acid salt of an anesthetic base which comprises the steps of preparing the oxalic acid salt of the anesthetic base by dissolving the reactants in a volatile solvent and thoroughly mixing the same until complete reaction takes place, stirring into the vehicle an aqueous solution of an amount of calcium salt of the aldonic acid in substantially equimolecular proportion to the anesthetic base used, evaporating the vehicle, adding boiling water to the residue and filtering off the calcium oxalate.

15. The method for preparing the compound of an anesthetic base with an aldonic acid to form an aldonic acid salt of the anesthetic base, which comprises the steps of dissolving an anesthetic base and an aldonic acid in substantially equimolecular proportions in a volatile solvent, removing the solvent and drying the residual aldonic acid salt of the anesthetic base.

16. The method for preparing benzocaine gluconate, comprising the steps of dissolving 16.5 grams of benzocaine and 19.6 gluconic acid in substantially 300 cc. of ethyl alcohol, removing the alcohol and drying the benzocaine gluconate.

DAVID CURTIS.